June 5, 1951           G. D. MITCHELL, JR         2,555,806
SEISMIC PROSPECTING METHOD INCLUDING GENERATION
OF CYLINDRICAL WAVE FRONT
Filed March 18, 1947                                2 Sheets-Sheet 1
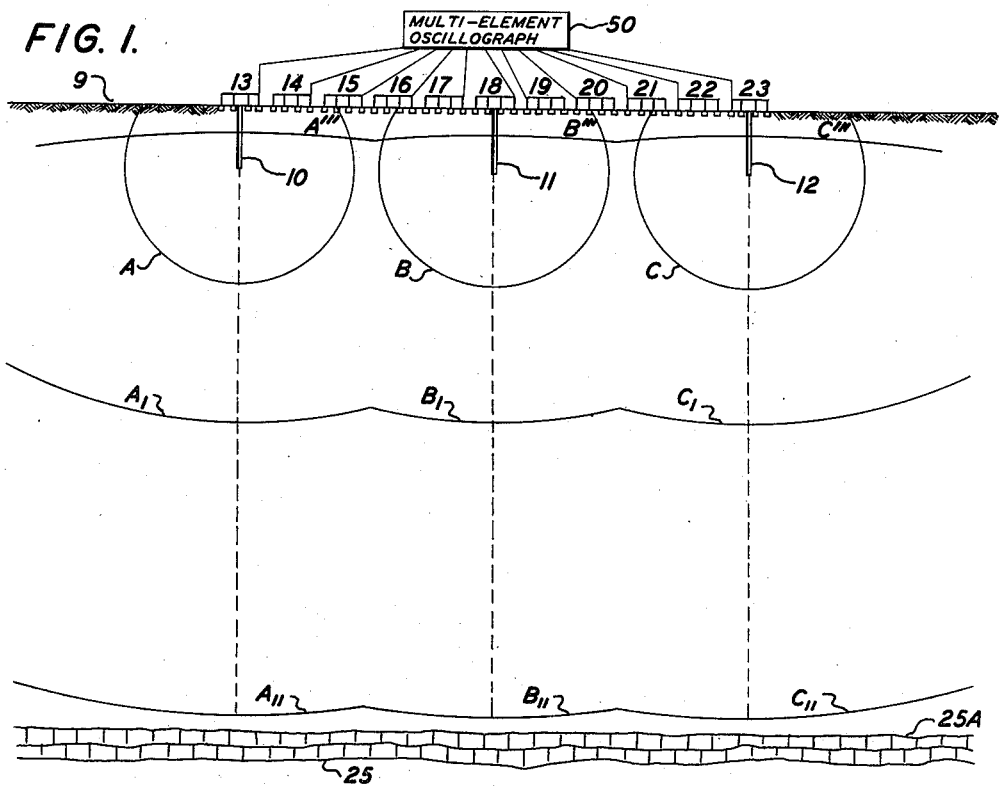
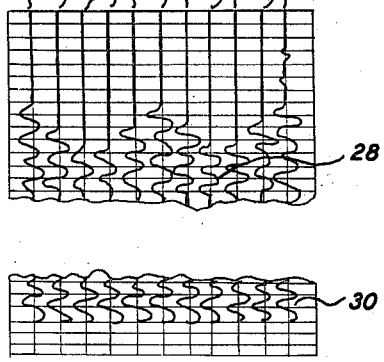
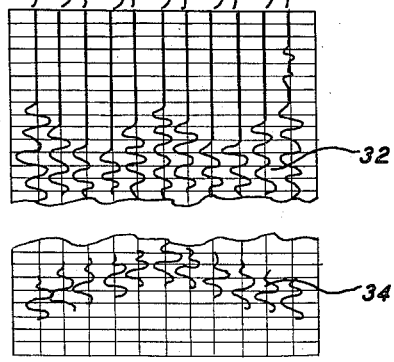
INVENTOR.
GEORGE D. MITCHELL JR.
BY
Daniel Stryker
ATTORNEY June 5, 1951 G. D. MITCHELL, JR 2,555,806
SEISMIC PROSPECTING METHOD INCLUDING GENERATION
OF CYLINDRICAL WAVE FRONT
Filed March 18, 1947 2 Sheets-Sheet 2
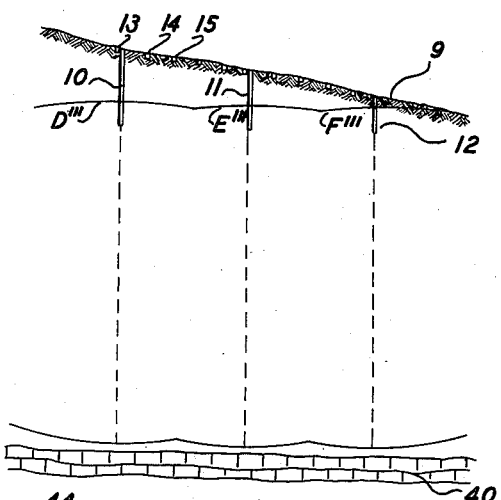
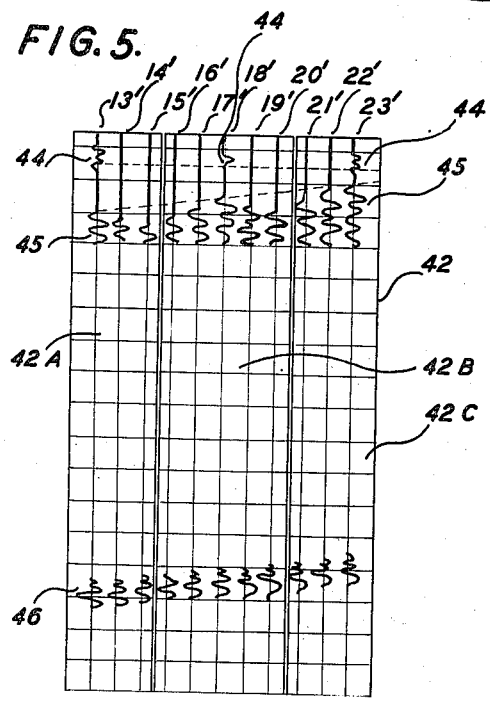
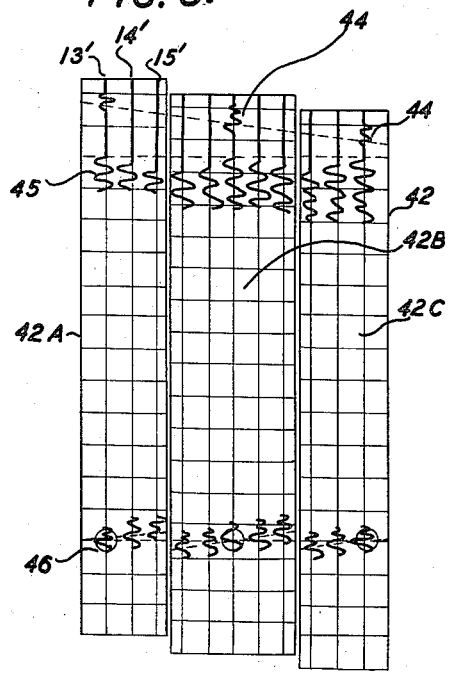
INVENTOR.
GEORGE D. MITCHELL JR.
BY
Daniel Stryker
ATTORNEY Patented June 5, 1951

2,555,806

UNITED STATES PATENT OFFICE 2,555,806

SEISMIC PROSPECTING METHOD, INCLUDING GENERATION OF A CYLINDRICAL WAVE FRONT

George D. Mitchell, Jr., Houston, Tex., assignor to Texaco Development Corporation, New York, N. Y., a corporation of Delaware Application March 18, 1947, Serial No. 735,289

11 Claims. (Cl. 181—.5)

This invention is concerned with geophysical prospecting, particularly prospecting involving the reception and recording of reflected seismic waves, and provides improvements which greatly reduce the work of computation from and interpretation of the records. In some instances, the invention permits determination of the shape of subsurface structures by mere inspection of the records.

Seismic prospecting is employed to determine the shape and location of subsurface geologic structures and is useful in the search for and development of oil fields, underground water reservoirs, mineral deposits, et cetera. In such prospecting, seismic waves are created artificially, usually adjacent the surface of the earth, and after refraction or reflection the waves are detected and recorded with vibration pickups such as geophones at one or more spaced points. In a common practice of seismic prospecting, employing the reflection method, a number of shot holes are drilled along a line on the surface of the earth, and are separated by distances varying from a few hundred to several thousand feet. A number of vibration pickups or detectors are distributed at spaced points in the neighborhood of a shot hole, usually between shot holes. The individual detectors are connected through suitable amplifying equipment to a multiple element oscillograph or other recording unit which records the vibrations picked up by the several detectors simultaneously as parallel traces on a photographic film or other record. With the detectors in place, a shot is fired in the hole, and a record of the resulting vibration at the detectors is made. A shot is then fired in another hole, and again the resulting vibrations are recorded at the same detector positions. The two records thus produced are then scrutinized for reflections which may be correlated, and computations to determine the position and shape of a geological structure underlying the survey area are made.

The foregoing method of shooting and recording, which, as indicated, involves separate shots at different times on opposite sides of a record spread, produces a record which shows the effect of the difference between detector spacings, usually called detector range difference, more prominently than it does the effect of vertical or depth distances. In consequence of these and other difficulties of interpretation, the office work involved in detailing a subsurface structure is tedious, slow and frequently uncertain.

I have developed improvements in reflection seismic prospecting which permit the production directly on a seismograph record of a picture of subsurface structural and stratographic conditions and also permit the combination on a single record of the most essential seismic data, which heretofore has been recorded on several such records. I attain these results by producing along a line of detectors or pickups a reflected seismic wave having a front of approximately cylindrical shape with the axis of the cylinder extending in the same general direction as the line of pickup points by initiating the wave with a plurality of approximately simultaneous but separate seismic disturbances at separate shot points spaced along a line running in the direction of the axis of the cylinder, the several shot points being so spaced from each other that the fronts of the waves originated at the several points combine to form that having the cylindrical wave front. In this manner, detector range differences are minimized so that the traces of the several detectors, if recorded simultaneously and side by side on a moving film or the like, are directly indicative of the subsurface structure from which the reflected waves come.

The most usual practice of my invention involves firing a plurality of shots as nearly simultaneously as possible, but in some instances, for example when the detectors are placed along a sloping line on the surface, it may be desirable to tilt the axis of the cylindrical wave front so that it is roughly parallel with the line of the detectors as viewed in a vertical plane passing through that line. This may be accomplished by initiating the several seismic disturbances, i. e. the shots one after the other at slightly different times, starting with the shot point adjacent the high end of the detector line.

In the practice of the invention, for reasons discussed hereafter, it is advantageous to locate each shot point close to a different pickup or detector point, and in one aspect of the invention the shot points are laid out along a straight line with the detectors placed along the same line and with a detector almost over each shot point.

The traces may be recorded as a function of time, but in a preferred practice, they are recorded directly as a function of the depths at which successive portions of the recorded wave forms originate. Thus the record may be moved past the points at which the traces are recorded on it at a speed which varies as the velocity of the waves being picked up at the instant of recording.

These and other aspects of the invention will be apparent in the light of the following detailed description taken in conjunction with the accompanying drawing, in which:

Fig. 1 is a diagram of a geologic section showing the disposition of shot holes and detectors in one practice of the invention;

Fig. 2 is a single multiple element record obtained from the detectors of Fig. 1 in accordance with the invention;

Fig. 3 is a similar multiple element record obtained in the practice of the invention when the reflection interface is arched upward across the section, for example in the case of a dome or when the section crosses an anticline;

Fig. 4 is a diagram of a geological section similar to that of Fig. 1 except that the line of detectors is placed on a sloping surface;

Fig. 5 is a multiple element record obtained from the detectors of Fig. 4 on a segmented chart; and Fig. 6 illustrates means for obtaining the true picture of the reflecting interface in Fig. 4 from the chart of Fig. 5.

Referring to Fig. 1, it will be observed that three shot holes 10, 11, 12 extend along a straight line and are spaced from each other by considerable distance, say several hundred feet. A detector spread comprising a set of 11 pickups 13, 14, 15, 16, 17, 18, 19, 20, 21, 22, 23 is placed along the line of shot holes with the detector 13 adjacent the shot hole 10, the detector 18 adjacent the shot hole 11 and the detector 23 adjacent the shot hole 12. Each detector unit may comprise one or more vibration pickups. In the case illustrated in Fig. 1, each detector unit has four pickups, the outputs of which are mixed and delivered after suitable amplification by conventional means (not shown) to a multiple element oscillograph 50. Explosive charges are fired simultaneously at shot points 10, 11, 12 with resultant production of three separate seismic waves which pass downwardly into the earth. The wave front of each wave, A, B, C takes the form of an expanding sphere so that at some distance underground the three wave fronts A', B', C' merge together to form a roughly cylindrical downwardly moving front, the axis of the cylinder being a line drawn through the three shot holes. As the resulting coalesced cylindrical wave front moves farther down in the earth, the radii of its components increase, and a section through the front taken parallel to the axis approaches a straight line. When the coalesced wave strikes a reflecting bed 25, the resulting reflected wave will have a still flatter front (as viewed in the section of Fig. 1), since the apparent axes of origin (not shown) of its three spherical components will be located below the reflecting interface 25A by a distance equal to the distance from the interface to the axis of origins of the unreflected components, i. e. the shot points. In consequence, the front of the coalesced or combined reflected wave A''', B''', C''', as it approaches the line of detectors, will be still closer to the approximation of a straight line, assuming of course that conditions of wave propagation are equal across the section of Fig. 1.

Fig. 2 illustrates the type of record produced with the seismic method just described when vibrations are initiated in the earth simultaneously at the three shot points 10, 11, 12, and the reflected coalesced wave is picked up by the eleven groups of detectors. In the chart shown in Fig. 1, the vibrations detected by the detectors 13, 14, 15 etc. are indicated by traces 13', 14', 15' etc. respectively. Refracted waves from shot points 10, 11, 12 are registered on each of the detectors after a relatively short time interval and are shown on the chart as zigzags 28 occurring on each trace at the top of the chart. However, as the reflected waves, exemplified by the wave front A''', B''', C''', return to the detectors from the reflecting interface 25A, zigzags 30, representative thereof, appear on the chart. Since the waves reflected from each of a series of horizontal beds underlying the detectors arrive respectively at the detectors at approximately the same instant, the zigzags 30 are lined up on the chart indicating the horizontal disposition of the underlying geological strata, and this information is obtained directly from the chart of Fig. 2 by inspection.

If instead of being flat as shown in Fig. 2 the reflecting bed 25 and its reflecting interface 25A were arched across the section (which would be the case if the section crossed a dome or an anticline), a chart similar to that of Fig. 3 would be obtained in the operation which has been described with reference to Fig. 1. Thus in Fig. 3 the refracted waves produce the "refraction" zigzags 32 in the early portions of the traces 13', 14', 15', etc., but when the reflections begin to arrive from the arched interfaces underlying the detectors, a set of zigzags 34 appears on the record. These traces 34 of the reflections do not lie in a straight line as in the case of reflections 30 resulting from horizontal bedding, but instead are arched on the record. In other words, the arch of the bedding is pictured directly upon the record, and the presence of a dome or anticline is determined directly by inspection.

The ideal situation pictured in Fig. 1 is not always encountered under field conditions, since the earth's surface is not level, and the line of detectors and shot points may be sloping. Such a case is illustrated in Fig. 4 wherein the surface 9 of the earth slopes downward from left to right with the line of detectors following such a slope. The shot holes 10, 11, 12 are drilled so that the shots may be placed on a level line. If the practice described with reference to Fig. 1 is repeated in the situation diagrammed in Fig. 4, a reflected wave front D''', E''', F''' will result from reflections from a horizontal bed 40, and the reflected approximately cylindrical wave front will be approximately horizontal as viewed in the section of Fig. 4, so reflections from the bed 40 will arrive earliest at the detectors on the right hand end of the line and correspondingly later at the detectors on the left hand end of the line. The result of this staggering in arrival times is shown in Fig. 5. The instant at which the shots were fired to initiate seismic disturbance is indicated on the record by the time "break" 44 appearing on traces 13', 18', 23', since the corresponding detectors are disposed immediately adjacent the shot points and detect the instant of explosion. The distance between the time "break" 44 in each case and the arrival of the direct or refracted wave (as evidenced by "breaks" 45 on each trace) is proportional to the distance from the vibration source, i. e. the shot points to the surface. Thus the breaks 45, evidencing the arrival of the direct wave, slope upward on the chart of Fig. 5 from left to right. Similarly, the evidences of reflections from the bed 40 and other parallel reflecting horizons as indicated by the traces 46 have a similar slope upward from left to right on the record.

The direct wave "breaks" 45 give a clue for rearranging the record of Fig. 5 to compensate for the slope of the detector line. If the chart 42 of Fig. 5 is slit longitudinally into three pieces 42A, 42B, 42C, these may be adjusted to compensate for the sloping position of the detectors with respect to the vibration sources. In Fig. 6, each section of the record has been moved down with respect to the one on its left until the breaks 45 are in approximately a horizontal line. This adjustment places the reflection pattern indicated by the zigzags 46 in correct relative position, which in this case is a horizontal plane. Thus Fig. 6 gives an approximately true picture of the horizontal reflecting horizons underlying the traverse of Fig. 4.

My invention, as indicated above, contemplates the adjustment of a split record. If desired, this record may be prepared in advance for such splitting by longitudinal lines of perforations on the film, say a roll of light-sensitive paper. After the record has been made, it is split into a plurality of sections, say the sections 42A, 42B, 42C along the perforations, thus facilitating adjustment. Of course the record can be cut longitudinally following the recording of the traces even though the perforations are not employed.

As suggested heretofore, for purposes of obtaining on certain traces an accurate record of the time break, i. e. of the instant at which the shots are fired, it is desirable that at least one detector be located reasonably close to each shot point or other source of vibratory motion.

It is possible and in some cases convenient to compensate for a difference in slope between a reflecting interface and the line of detectors by tilting the axis of the cylindrical wave front. Thus in the case of Fig. 4, the cylindrical wave front D', E', F' can be tilted upward to the left by firing at the shot points 10, 11, 12 in calculated sequence. In such case, the shots are fired from left to right, and the time interval between them is very short so that attenuation of the individual waves originating at the shot points does not progress too far before the next portion of the wave is originated at the next shot point.

The records of Figs. 2, 3, 5 and 6 are plots of wave arrivals at detector positions against time on a linear scale. However, since the practice of the invention will produce records showing the relative shape of underlying reflecting interfaces, it is possible to scale the depth of any point on a reflecting surface directly from the record. This is best accomplished by recording the vibrations along a linear depth scale. Such a procedure is advantageous in correlation work. For example, if a depth scale is chosen so that one inch on the chart equals 100 feet of depth, it is possible to make a direct correlation between the seismic record and a well log taken in the same area.

The records of Figs. 2, 3, 5 and 6 are obtained by driving the recording film through a camera at a substantially constant linear speed, with the result that the time scale on the record is linear. However, any one of a number of mechanisms can be employed to cause the chart or film to travel through the recording device at a variable speed according to the time-velocity law. For example, if at the expiration of one second a reflected wave arriving at the detectors has an average velocity of 6,000 feet per second, at this time an interval of 0.01 second represents a depth increment of 30 feet. Conversely, if the record is driven at a speed varying according to the time-velocity law, one second after initiating the vibration one inch of record should pass the recording device in 0.033 second to correspond to the depth scale of 1"=100'. Similarly, if after two seconds the average velocity of the arriving waves is 7,000 feet per second, at this time the speed of the recording medium should be one inch per 0.028 second.

As indicated above, a variety of devices can be employed to vary the rate of travel of the chart in accordance with the time velocity law. Thus an adjustable clock-driven rheostat may be used to govern the speed of relative motion between recording medium and recording device.

In another aspect, the record may be driven at constant linear speed so that the time scale on the record is linear, employing an automatic means to mark on the chart a depth scale which, although not linear, would permit one to obtain depth data directly.

I claim:

1. In seismic prospecting involving the detection of a reflected seismic wave at a series of pickup points spaced along a line and the recording of traces of the wave forms picked up simultaneously and side by side on a single record, the improvement which comprises causing the wave as it approaches the line of pickup points to have a wave front of approximately cylindrical shape with the axis of the cylinder extending in the same general direction as the line of pickup points by initiating the wave with a plurality of approximately simultaneous but separate seismic disturbances at separate shot points spaced from each other along a line running in the direction of the axis of the cylinder, the several shot points being sufficiently close together that the fronts of the waves originating at the several points combine to produce the cylindrical wave front.

2. Process according to claim 1 in which the axis of the cylindrical wave front is tilted by initiating the several disturbances at slightly different times, the degree of tilt of the wave front being approximately the same as the degree of tilt of the line of pickup points.

3. Process according to claim 1 in which a plurality of waves are initiated at separate times at different places, but are picked up each time at the same pickup points, the several places being located respectively close to different pickup points.

4. Process according to claim 1 in which the traces are recorded directly as a function of depths at which successive portions of the recorded reflected wave forms originate.

5. Process according to claim 1 in which the record is moved past the points at which the traces are recorded on it at a speed which varies as the velocity of waves being picked up at the instant of recording.

6. Process according to claim 1 in which the record upon which the several traces are recorded is slit lengthwise to produce several longitudinal sections each bearing different traces, and these sections are moved longitudinally with respect to each other to compensate for differences in elevations of the corresponding pickup points.

7. In a method of seismic prospecting in which vibratory motion is initiated within the earth and detected simultaneously at a plurality of spaced detection points, the improvement which comprises initiating vibratory motions substantially simultaneously at a plurality of shot points disposed along a substantially straight line and so spaced from each other that wave fronts of the vibratory motions thus initiated merge to produce a wave having an approximately cylindrical front, and detecting reflections of the wave at a plurality of detection points disposed substantially along the line, a different detector point being located close to each shot point.

8. In a method of seismic prospecting in which vibratory motion is initiated within the earth, reflected therein, and detected simultaneously at a plurality of shot points, the improvement which comprises consecutively initiating vibratory motions at a series of shot points disposed along a line and so spaced from each other that the vibratory motions initiated at the several points merge to produce a wave with a roughly cylindrical front, detecting reflections of the wave at a plurality of detection points disposed substantially along the line on the surface of the earth, a different detection point being located close to each shot point, and regulating the times between the initiation of the several vibratory motions so that the degree of tilt of the cylindrical wave front is roughly parallel to the degree of tilt of the line of detection points on the surface.

9. In seismic prospecting involving the detection of a reflected seismic wave at a series of pickup points spaced along a line and the recording of traces of the wave forms picked up simultaneously, the improvement which comprises causing the wave as it approaches the line of pickup points to have a wave front of approximately cylindrical shape with the axis of the cylinder extending in the same general direction as the line of pickup points by initiating the wave with a plurality of approximately simultaneous but separate seismic disturbances at separate shot points spaced from each other along a line running in the direction of the axis of the cylinder, the several shot points being sufficiently close together that the fronts of the waves originating at the several points combine to produce the cylindrical wave front, and the amplitude of each wave pattern detected respectively at the pickup points being recorded against a scale which varies as the depth from which the wave arrives as determined by the time velocity law of vibratory wave propagation in the earth.

10. In seismic prospecting involving the detection of a reflected seismic wave at a series of pickup points spaced along a line and the recording of traces of the wave forms picked up simultaneously, the improvement which comprises causing the wave as it approaches the line of pickup points to have a wave front of approximately cylindrical shape with the axis of the cylinder extending in the same general direction as the line of pickup points by initiating the wave with a plurality of approximately simultaneous but separate seismic disturbances at separate shot points spaced from each other along a line running in the direction of the axis of the cylinder, the several shot points being sufficiently close together that the fronts of the waves originating at the several points combine to produce the cylindrical wave front, and the amplitude of each wave pattern detected respectively at the pickup points being recorded side by side on a single record against a scale which varies as the depth from which the wave arrives as determined by the time velocity law of vibratory wave propagation in the earth.

11. In seismic prospecting involving the detection of a reflected seismic wave at a series of pickup points spaced along a line and the recording of traces of the wave forms picked up simultaneously, the improvement which comprises causing the wave as it approaches the line of pickup points to have a wave front of approximately cylindrical shape with the axis of the cylinder extending in the same general direction as the line of pickup points by initiating the wave with a plurality of approximately simultaneous but separate seismic disturbances at separate shot points spaced from each other along a line running in the direction of the axis of the cylinder, the several shot points being sufficiently close together that the fronts of the waves originating at the several points combine to produce the cylindrical wave front, and the amplitudes of the wave patterns detected respectively at the pickup points being recorded side by side against the depths from which the respective waves arrive as determined by the time velocity law of vibratory wave propagation in the earth.

GEORGE D. MITCHELL, JR.

REFERENCES CITED

The following references are of record in the file of this patent:

UNITED STATES PATENTS

| Number | Name | Date |
| --- | --- | --- |
| 800,391 | Palmer | Sept. 26, 1905 |
| 1,263,365 | Bishop | Apr. 23, 1918 |
| 1,385,576 | Odell | July 26, 1931 |
| 2,133,484 | Sherar | Oct. 18, 1938 |
| 2,156,198 | Scherbotskoy | Apr. 25, 1939 |
| 2,259,478 | Morgan | Oct. 21, 1941 |
| 2,268,130 | Slotnick | Dec. 30, 1941 |
| 2,340,314 | Farnham | Feb. 1, 1944 |
| 2,354,548 | Ricker | July 25, 1944 |
| 2,420,672 | Maillet | May 20, 1947 |
| 2,427,421 | Rieber | Sept. 16, 1947 |
| 2,440,971 | Palmer | May 4, 1948 |